United States Patent Office

3,804,786
Patented Apr. 16, 1974

3,804,786
WATER-DISPERSIBLE CATIONIC POLY-
URETHANE RESINS
Kazys Sekmakas, Chicago, Ill., assignor to De Soto, Inc.,
Des Plaines, Ill.
No Drawing. Filed July 14, 1971, Ser. No. 162,659
Int. Cl. C08g 22/04
U.S. Cl. 260—18 PT                12 Claims

ABSTRACT OF THE DISCLOSURE

Water-dispersible cationic resins, and especially polyurethane resins, are provided by reacting a resinous polyepoxide with a stoichiometric deficiency of polyisocyanate to provide an hydroxy-functional polyurethane in which tertiary amine functionality is generated by reaction with a monosecondary amine to provide dispersibility in water with the aid of an acid. Some of the epoxy functionality is consumed by esterification with a monocarboxylic acid to provide internal plasticization and enhance film formation. This is especially important when the resins are electrodeposited at the cathode. The monocarboxylic acid may be unsaturated to provide a basis for cure which is independent of the hydroxy functionality.

---

The present invention relates to water dispersible resins, especially polyurethane resins, which are derived from resinous polyepoxides by reactions, and especially addition reactions, including reaction of epoxy functionality with a monosecondary amine.

While the main thrust of the invention is broadly in the direction of water dispersible resins and aqueous coating systems including those particularly adapted for cathodic electrodeposition, the invention includes numerous features of importance including reaction procedures which enable conventional epoxy resins to be utilized as starting materials, and the inclusion of frosting oil fatty acids which enable curing temperatures to be minimized. The invention includes curable systems containing aminoplast resins and also resin containing unsaturated esters with monocarboxylic acids to permit cures in the absence of any extraneous curing agent. The invention still further includes polyurethane resins which have been so-modified as to enable aqueous dispersions containing the same to be employed in electrocoating processes in which a unidirectional electrical current is passed through the aqueous bath containing the dispersed resin to cause the resin to deposit at the cathode of the system, it being quite advantageous to use cathodic deposition since the conventional anodic deposition entraps metal ions within the deposited film and requires acidic groups which may remain to degrade chemical resistance.

The present invention starts by utilizing a resinous polyepoxide which is reacted with several components in any order. In preferred practice, the monosecondary amine is reacted last to consume the balance of the epoxy groups which are present. When the polyepoxide lacks sufficient hydroxyl groups for reaction with the desired proportion of polyisocyanate, then the polyepoxide is first reacted with a stoichiometric deficiency of monocarboxylic acid, which is preferably a drying oil fatty acid, and most preferably a frosting oil fatty acid, the stoichiometry being between the carboxyl groups of the acid and the epoxy groups of the resinous polyepoxide. In this way, a resinous polyhydric alcohol is provided by a relatively low temperature reaction which may be used to introduce drying unsaturation.

It should be noted immediately that when the drying unsaturation is highly reactive as is typical of frosting oil fatty acids such as tung oil and China wood oil, the resins which include such highly reactive unsaturation have a strong tendency to gel during the further processing of the resin unless such further processing is carried out at a low reaction temperature. In this connection, simple addition reactions can frequently be handled at temperatures which will not gel frosting oil fatty acid esters whereas condensation reactions generally require far higher reaction temperatures which could not be permitted if any significant proportion of frosting oil component was present.

As will be evident, the acid-epoxy reaction is an addition reaction which forms an hydroxy ester so that, if the resinous polyepoxide does not contain hydroxy groups prior to reaction with the fatty acid, then such hydroxy groups are generated by the reaction. More generally, the resinous polyepoxide may include hydroxy functionality prior to reaction with fatty acid and such reaction generates further groups to add to the available hydroxy functionality in the resin.

As will be apparent hereinafter, the molecular weight of the starting resinous polyepoxide will be considerably enhanced by subsequent reactions and it is intended that the product ultimately be dispersed in water. Thus, the resinous polyepoxide should possess limited molecular weight as indicated by extensive solubility in organic solvents. From the standpoint of resinous polyepoxides having a linear aromatic backbone, these may have a molecular weight in the range of from about 300 to about 4000, but preferably have a molecular weight of from 350 to 2000 to minimize the hydroxyl functionality. These are preferably diglycidyl ethers of bisphenols such as bisphenol A and include a significant hydroxy functionality in addition to a 1,2-epoxy equivalency of 1.2 or greater. The preferred materials have an epoxy equivalency of from 1.4 to 2.0. Other resinous polyepoxides are illustrated by copolymers of glycidyl methacrylate and epoxidized oils and epoxidized polyolefins. These addition polymers may possess somewhat higher molecular weight since their straight chain carbon backbone is more highly soluble. However, these addition polymers do not contain a high proportion of epoxy at low epoxy functionality and, hence, this invention is much less applicable to these materials, even though the invention is broadly useful therewith.

The product obtained above is an hydroxy functional partial ester containing residual epoxide groups. This resinous product can then be treated utilizing steps, the order of which are subject to considerable variation, but one important step of which is a reaction with a stoichiometric deficiency of organic polyisocyanate. The purpose is to extend the chain of the resinous polyol through urethane formation and to provide in this way an epoxy functional polyurethane. A feature of this invention is to react diisocyanate with the polyepoxide before the hydroxy functionality becomes too high. Thus, if the initial hydroxy functionality is high, the diisocyanate can be used first to minimize cross-linking. If the initial hydroxy functionality is not excessive, then the diisocyanate can be used after the epoxy groups are only partly consumed, as by reaction with either acid or amine as later pointed out.

The reaction of organic polyisocyanate which is preferably constituted by organic diisocyanate, is a low temperature addition reaction which can be carried out to completely consume the isocyanate functionality without gelling any unsaturated component which may have already been introduced.

The essential reaction in this invention is the reaction of epoxy groups with a monosecondary amine in order to generate tertiary amine groups (as well as hydroxy groups) without thereby increasing molecular weight. A considerable proportion of tertiary amine groups is required to solubilize the epoxy resin derivative and it is important to be able to obtain these independent of polymer growth mechanisms. Otherwise, there is no way to control the crosslink density of the polymer while providing the number of tertiary amine groups which are needed. Thus, monosecondary amines are critical to this invention. The practicality of this invention depends upon the capacity to separately determine tertiary amine functionality and molecular growth so that each is appropriate.

The amines which are useful herein are illustrated by diethanol amine, dimethanol amine, dipropanol amine, etc. These hydroxy amines are particularly preferred since they introduce hydroxy functionality to aid water dispersibility. While other amines such as diethyl amine or dipropyl amine are useful, the hydroxy amines are superior.

Among the unsaturated acids which may be used are acrylic or methacrylic, or crotonic acids or maleic half esters and the like. A portion of the monoacid utilized to consume the epoxy functionality of the resinous polyepoxide may be replaced by a polycarboxylic acid, and especially by dicarboxylic acids, in order to increase the molecular weight of the starting polyepoxide. Thus, saturated dicarboxylic acids such as succinic acid or adipic acid may be used and unsaturated dicarboxylic acids such as maleic acid or fumaric acid can also be used. Combinations of unsaturated mono- and diacids like acrylic or castor fatty acids with maleic are especially useful.

The resins of this invention which are dispersible in water with the aid of an acid will contain from 2-40% by weight of the monosecondary amine component, preferably from 3-20%, and most desirably from 5-15%.

For electrocoating purposes, it is preferred that the amine component be less than 20% by weight.

Since ultimate dispersion in water is desired, the solvent used during the reactions discussed hereinbefore is preferably water miscible and inert with respect to the various reactants contemplated herein. Ketones such as methyl ethyl ketone and 2-ethoxy ethanol acetate will illustrate useful solvents which may ultimately be carried into the aqueous dispersions which are formed. Even when organic solvent is not present in the preparation of the resinous product, it is desirably used to thin the same, and the same basis for selecting the solvent applies. From 10-50% of water miscible organic solvent, based on the weight of resin solids, is desirably present.

The specific nature of the monocarboxylic acid which is employed is of secondary significance and, indeed, a proportion of polycarboxylic acid may be present as has been discussed hereinbefore. While drying properties are frequently desired so that drying oil fatty acids including semi-drying alcohol fatty acids and frosting oil fatty acids are preferred, the presence or absence of unsaturation is not a crucial aspect of the invention with the exception of the unusual capacity of the invention to employ frosting oil fatty acids as has been noted. Typical fatty acids which may be employed are butyric acid, hexoic acid, dehydrated castor oil fatty acids, linseed fatty acids and tall oil fatty acids. The drying fatty acids are especially preferred for systems, and especially primer systems, which cure in the substantial absence of aminoplast resin (0–10%). They also contain more than 6 carbon atoms and, hence, provide desired internal plasticization and enhanced film forming properties which are especially beneficial to avoid film porosity upon electrodeposition at the cathode. Film porosity leads to rusting on salt spray exposure.

As previously indicated, the resinous polyepoxide starting material is subjected to several reactions, the order of which can be varied considerably. In this sequence of reactions, one important reactant is organic polyisocyanate, preferably constituted by organic diisocyanates. This class of materials is well known and is illustrated by the conventional toluene diisocyanates including mixed isomers thereof. While the invention will be illustrated by the use of toluene diisocyanate, the invention is not so limited and, when color is important, aliphatic diisocyanates are preferred.

With respect to the aliphatic diisocyanates, the aliphatic portion of the compound is preferably a divalent hydrocarbon radical containing at least 6 carbon atoms, preferably more than 10 carbon atoms, and up to about 22 carbon atoms. The hydrocarbon group may be straight, branched, or cyclic since all of these are useful in the practice of the invention. The diisocyanates are particularly preferred since higher functional compounds are troublesome with respect to gelation and water dispersibility, but can be used in small amount if care is taken.

Examples of aliphatic diisocyanates which may be used include dicyclohexane - 4,4' - diisocyanate, tetramethylene diisocyanate, hexamethylene diisocyanate, and the like. Especially desirable is 4,4'-methylenebis(cyclohexyl isocyanate) which is a cycloaliphatic compound. Also useful are the diisocyanates based on fatty acid dimers such as that produced by dimerizing a $C_{18}$ fatty acid to obtain an aliphatic diisocyanate based on a 36 carbon divalent hydrocarbon radical. Branched chain diisocyanates are illustrated by 2-ethyl hexane 1,6-diisocyanate.

The proportion of organic diisocyanate is important. While the invention broadly contemplates the use of up to 25% by weight, based on the weight of the final resinous product, it is preferred that a smaller proportion be used, the preferred proportions on the same basis ranging from 0.25–15% by weight. Most preferably, from 0.5–10% of diisocyanate is used. Of course, a stoichiometric deficiency of diisocyanate is essential and it is preferred to use a ratio of hydroxy to isocyanate of from 3:2 to 50:1, preferably from 2:1 to 30:1.

When frosting oil fatty acid is used and it is intended to rely on low temperature curing reactions, then one would wish to maximize molecular weight and, for this purpose, larger proportions of diisocyanate should be used in order to extend the chain of the resin to the extent desired. A ratio of hydroxy to isocyanate of less than 15:1 is preferred to maximize resinification.

It is stressed that while small proportions of diisocyanate are contemplated and preferred, these exhibit a considerable effect on the resin which is produced in that toughness and flexibility are significantly enhanced.

The aliphatic diisocyanates are particularly preferred because they contribute superior color properties, but these properties are of limited significance if the monocarboxylic acid is not also selected for good color.

With further reference to the stoichiometry of the system, it will be appreciated that the monocarboxylic acid is normally used in stoichiometric deficiency to consume at least a portion of the epoxy functionality of the resinous polyepoxide. Correspondingly, the monosecondary amine will also be used in stoichiometric deficiency with respect to the epoxy functionality of the original resinous polyepoxide since it is desired that all of the monosecondary amine be consumed by reaction. Also, and while both the monocarboxylic acid and the monosecondary amine are used in stoichiometric deficiency, the combined amount thereof will preferably be sufficient to consume substantially all of the epoxy functionality in the resinous polyepoxide.

Also, and as previously stressed, all of the reactions which are utilized herein are addition reactions, and these are conveniently referred to as adducts. Indeed, a small proportion of the hydroxy functionality in the resin may be reacted with a polycarboxylic acid monoanhydride illustrated by trimellitic anhydride or maleic anhydride in order to provide a small acid functionality (an acid value of about 5 to about 25) in order to serve as an internal acid catalyst to enhance the aminoplast cure. However, in the systems under consideration, the aminoplast cure is excellent and does not normally require internal catalysis.

From the standpoint of water solutions, it will be appreciated that the resins are dispersed in water with the aid of an acid, the specific nature of the acid being of secondary significance. Inorganic acids such as hydrochloric acid or sulfuric acid are quite useful, though it is presently preferred to employ organic acids such as formic acid, acetic acid, propionic acid, or butyric acid.

The water dispersions which are provided are desirably employed for electrocoating in which a unidirectional electrical current is passed through an aqueous bath containing the dispersed resin and then through an object to be coated as cathode in order to electrophoretically deposit the resin solids on the surface of the cathode. Cathodic deposition possesses numerous advantages over the far more widely used anodic deposition methods and it will be appreciated that the cathodic electro-deposition under consideration is known. Thus, one would normally employ a bath having a resin solids content of from 3–25%, preferably from 5–15%, and having a pH in the range of 2 to 7, preferably 3 to 6. Far higher solids content (at least about 30%) is needed for conventional application as by spray, roller coat, brush, etc.

In electrodeposition, aminoplast resins are normally used to aid the cure in an amount of 5–50% of total resin, the solids content of the bath is low and the electrocoated films possess unusually superior gloss, hardness, flexibility and salt spray resistance providing excellent single coat electrodeposition systems. Also, and while various aminoplast resins are frequently used to aid the cure, these aminoplast resins will migrate to the cathode together with the resins of this invention in the aqueous acidic medium. In this respect, the cathodic deposition is somewhat simpler than the corresponding anodic deposition. On the other hand, and in the substantial absence of aminoplast and using a drying fatty acid to provide an oxidative cure, water soluble primers for coil coatings are provided which are highly flexible and impact resistant and which display excellent adhesion to metal bases and topcoats which present adhesion problems.

It will further be appreciated that pigment may be dispersed with the resins of this invention for codeposition therewith and various other conventional additions are also appropriate as is well known.

The invention is illustrate in the following examples.

EXAMPLE 1

Parts by weight:
  670 diglycidyl ether of bisphenol A having an average molecular weight of 670 (2 epoxy equivalents)
  72 acrylic acid (1 equivalent)
  2 triethyl amine
  350 methyl ethyl ketone
    Charge the above into reactor and heat to 50° C. Hold for an acid value of less than 4. Check viscosity (F—Gardner-Holdt) 1.4 poise.
  0.2 dibutyl tin oxide
    Add dibutyl tin oxide catalyst.
  63 toluene diisocyanate
    Add diisocyanate over a 30 minute period and hold for a viscosity of Y–Z—20 poises.
  105 diethanol amine (1 equivalent)
    Cool to 35° C., and add amine slowly over a 15 minute period. Hold at 35° C. for 30 minutes. Reheat to 70° C. and hold for 2 hours to react amine with epoxy.
  75 glacial acetic acid
  35 water
    Add acid and water and cool to provide the following final characteristics:
      Solids: 68.01%
      Viscosity (Gardner-Holdt) $Z_3$
      Color (Gardner) 2–3

EXAMPLE 2

Parts by weight:
  750 diglycidyl ether of bisphenol A having an average molecular weight of 1000 (1½ epoxy equivalent)
  210 dehydrated castor fatty acids (0.75 equivalent)
  2 triethyl amine
  100 methyl ethyl ketone
    Heat the above to 120° C. and hold for an acid value of less than 2. Start cooling to 60° C. and add the following solvent and catalyst:
  200 methyl ethyl ketone
  0.2 dibutyl tin oxide
    Adjust temperature to 60° C. and add:
  30 toluene diisocyanate
    Hold for one hour at 60° C. Heat to 90° C. and hold for 30 minutes. Cool to 35° C. and add:
  77 diethanol amine (0.75 equivalent)
    Add amine. Hold 30 minutes. Reheat to 70° C. and hold for 2 hours. Cool to 30° C.
  50 glacial acetic acid
    Add slowly with agitation and cool to provide a product having the following final characteristics:
      Solids: 71.1%
      Viscosity (Gardner-Holdt) $Z$–$Z_1$
      Color (Gardner) 6–7

Evaluation of Example 1 (Preparation of solution for cathodic electrodeposition)

Premix 100 parts of the resin of Example 1 with 10 parts of isopropyl alcohol and 15 parts of a water dispersible methylated-ethylated benzoguanamine resin (American Cyanamid Resin XM 1123 may be used). Utilizing high speed agitation, add 900 parts deionized water gradually over a five minute period to provide a solution having a pH of 4.1. In this evaluation, the coating operation is performed in a metal tank which is equipped with a recirculating pump and a thermometer. The tank serves as an anode and bare zinc phosphate treated steel panels are utilized as the cathodes. Direct current is imposed on the metal container and on the panels (cathode) from an external circuit. The results which are obtained are reported in the following tabulation.

| Voltage | 100 | 125 | 150 | 160 |
|---|---|---|---|---|
| Deposition time | 60 secs | 60 secs | 60 secs | 60 secs. |
| Film thickness (mil) | .15 | .28 | .44 | .60. |
| Gloss ((60°)) | 76 | 82 | 89 | 97. |
| Solvent resistance | In each instance, pass 50 methyl ethyl ketone double rubs | | | |
| Cure time | 20 mins | 20 mins | 20 mins | 20 mins. |
| Pencil hardness | 2H | 2H | 2H | 2H. |
| Cure temperature | 400° F | 400° F | 400° F | 400° F. |
| Flexibility (1.8″ conical mandrel) | Pass | Pass | Pass | Pass. |
| 200 hour 5% salt spray | No rust, not effected. | No rust. | No rust. | No rust. |

Evaluation of the resin of Example 2 (As aqueous solution coating for cathodic electrodeposition)

The resin of Example 2 was diluted with water to 50% solids and a 1 mil film was applied on aluminum panel utilizing wound-wire rod. The film was cured at 500° F. for two minutes and provided an adherent, solvent resistant film, having a pencil hardness of F to H, and excellent adhesion and flexibility properties. The films pass 40 inch pounds of reverse impact and provide excellent primers for use in coil coating.

The invention is defined in the claims which follow.

I claim:

1. Water dispersible cationic resin comprising organic-solvent-soluble resinous polyepoxide having an epoxy functionality of at least 1.2 adducted under non-gelling conditions with monocarboxylic acid, monosecondary amine and organic polyisocyanate, said monocarboxylic acid and monosecondary amine each being used in a stoichiometric deficiency, with the total amount thereof being sufficient to consume all of the epoxy functionality of said polyepoxide, said monocarboxylic acid forming hydroxy ester groups, and said organic polyisocyanate being used in stoichiometric deficiency with respect to hydroxy of from 3:2 to 50:1 to provide an hydroxy functional polyurethane containing from 2-40% by weight of said monosecondary amine component and which is dispersible in water with the aid of an acid to provide cationic groups in the resin.

2. Water dispersible cationic resin as recited in claim 1 in which said organic polyisocyanate is a diisocyanate and said polyepoxide contains hydroxy groups, said diisocyanate being adducted with said polyepoxide before the epoxy groups are consumed to increase the hydroxy functionality.

3. Water dispersible cationic resin as recited in claim 2 in which the ratio of hydroxy groups to isocyanate groups is from 2:1 to 30:1.

4. Water dispersible cationic resin as recited in claim 2 in which the ratio of hydroxy groups to isocyanate groups is less than 15:1 and said monocarboxylic acid is a frosting oil fatty acid.

5. Water dispersible cationic resin as recited in claim 1 in which said monocarboxylic acid is a drying oil fatty acid.

6. Water dispersible cationic resin as recited in claim 1 in which said monocarboxylic acid is a frosting oil fatty acid.

7. Water dispersible cationic resin as recited in claim 1 in which said resinous polyepoxide is a diglycidyl ether of a bisphenol having a molecular weight in the range of from about 350 to about 2000 and a 1,2-epoxy equivalency of from 1.4 to 2.0.

8. Water dispersible cationic resin as recited in claim 1 in which said monosecondary amine is an hydroxy amine.

9. Water dispersible cationic resin as recited in claim 8 in which said hydroxy amine is selected from the group consisting of dimethanol amine, diethanol amine, and dipropanol amine.

10. Water dispersible cationic resin as recited in claim 1 in which said cationic resin contains less than 20% by weight of said monosecondary amine component.

11. An aqueous dispersion comprising the cationic resin of claim 1 dispersed in water with the aid of an acid, said dispersion including from 10-50% of water miscible organic solvent, based on resin solids.

12. A method of producing a water-dispersible cationic resin comprising first adducting an organic solvent-soluble hydroxy functional resinous polyepoxide with a stoichiometric deficiency of organic diisocyanate, and then adducting the hydroxy functional polyurethane so-produced with a mono-secondary amine.

References Cited
UNITED STATES PATENTS

| | | | |
|---|---|---|---|
| 3,449,281 | 6/1969 | Sullivan et al. | 260—29.2 |
| 3,336,253 | 8/1967 | Wong et al. | 260—29.2 |
| 3,424,719 | 1/1969 | Masters | 260—47 |
| 3,624,013 | 11/1971 | Sekmakas et al. | 260—18 |
| 3,607,800 | 9/1971 | Sekmakas | 260—18 |
| 3,491,050 | 1/1970 | Keberle et al. | 260—29.2 |
| 3,479,310 | 11/1969 | Dietrich et al. | 260—29.2 |

DONALD E. CZAJA, Primary Examiner

E. C. RZUCIDLO, Assistant Examiner

U.S. Cl. X.R.

204—181; 260—18 EP, 18 TN, 29.2 EP, 29.2 TN